April 28, 1942.  W. H. FARR  2,281,426
PISTON RING AND METHOD OF MAKING SAME
Filed April 23, 1938
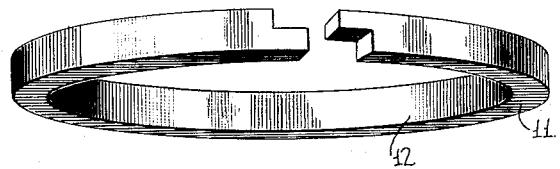
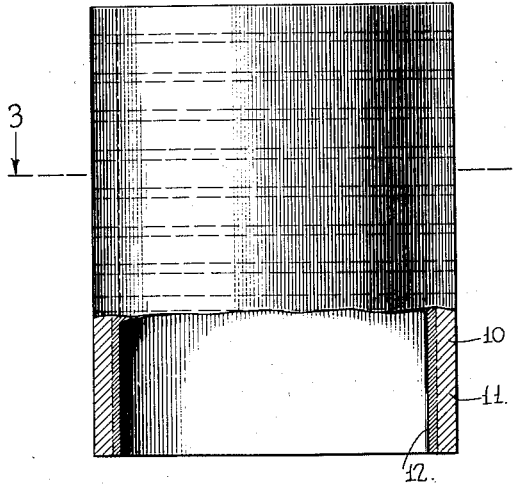
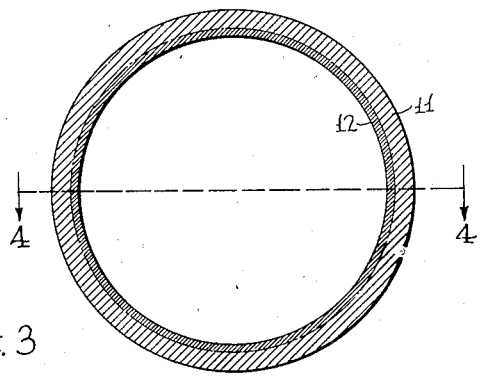
INVENTOR:
WARREN H. FARR.
BY
ATTORNEY.

Patented Apr. 28, 1942

2,281,426

UNITED STATES PATENT OFFICE 2,281,426

PISTON RING AND METHOD OF MAKING SAME

Warren H. Farr, Detroit, Mich., assignor to Budd Wheel Company, Philadelphia, Pa., a corporation of Pennsylvania Application April 23, 1938, Serial No. 203,784

2 Claims. (Cl. 29—156.6)

The present invention relates in general to resilient bearing elements and method of making the same, and more specifically to metallic piston rings and the like.

The main object of the invention is to provide a spring ring such as a piston ring or like article having the quality of resiliency without such hardness as would be undesirable in a sliding bearing element such as a piston ring intended not to produce substantial wear on the complementary bearing element such as an engine cylinder wall.

Among other articles contemplated are hollow pistons such as have a split skirt portion to which the desired qualities above mentioned are to be imparted.

Another object is the provision of a piston ring or like article having a resilient portion and an integral relatively soft portion, the latter having the qualities desired in a bearing intended not to produce substantial wear or scoring of its complementary bearing member.

A specific object is the provision of a split metallic piston ring having a tempered or hardened portion of high spring quality near and including its inner face, and an integral, normalized or relatively soft portion including the outer or bearing face.

A further object is the provision of an economical and efficient method of producing piston rings or like articles of the above kind.

Heretofore, where the resilient spring quality of tempered steel was desired together with those qualities of cast iron or soft or normalized steel which make the latter most desirable in a piston ring, it has been the practice to use an outer ring of cast iron or like material together with a separate inner expansion ring of tempered steel, thus combining the two qualities heretofore not attainable in an integral ring element. The present invention presents a simplified economical solution of this problem in its provision of an integral ring element combining the above desired qualities. An advantage of the integral structure here disclosed is that the softer or outer portion of the ring may be thinner in proportion to the inner resilient portion than is usual with the separate inner and outer elements, inasmuch as the two portions are integral and the outer portion does not have to rely wholly upon its strength alone but is reinforced by the inner integral portion so that the strength of the ring is the combined strength of the whole.

Various other objects and advantages of the invention will be apparent from a perusal of the following specification and the drawing accompanying the same.

In the drawing:

Fig. 1 is a perspective view of a piston ring embodying the invention.

Fig. 2 is a side elevation partly in section of a treated cylinder from which the rings are cut.

Fig. 3 is a section on the line 3—3 of Fig. 2.

Fig. 4 is a section on the line 4—4 of Fig. 3.

Referring to the drawing in detail and first to Fig. 2, 10 represents a cylinder of piston ring material such as any metal or alloy hardenable by heat treatment preferably a ferrous alloy of a composition such as to have, in the normalized state, the requisite firmness and softness desirable for the outer portion of the piston ring, and which upon tempering or heat treating will assume the quality of resiliency, toughness and other qualities also desirable in a piston ring. This localized difference in quality is represented in the drawing by the different densities of hatching wherein the outer lightly hatched portion 11 indicates the unhardened or normalized zone and the inner densely hatched portion 12 the hardened or heat treated zone. This localized difference in quality is attained by suitable differential heat treatment of the cylinder blank 10, preferably through localized heating produced by high frequency electro-magnetic induction followed by quenching, for example such as is disclosed in the copending applications of Howard E. Somes Serial No. 50,829, filed November 21, 1935, for Inside induction heating, and Serial No. 164,320, filed September 17, 1937, for an Induction heating treating apparatus. Thus treated, the outer portion including the external surface of the cylinder blank has that relative softness and toughness requisite for wearing purposes while the interior hardened zone has the quality of a high degree of resilience.

With the cylinder blank brought to the condition thus described, it is cut as by grinding or other suitable method, into separate continuous rings such as is shown in section in Fig. 4 which are thereafter split in any suitable manner to form the completed split piston ring as shown in Fig. 1. A preferred method of effecting this splitting of the ring is to grind through part way from one flat surface toward the other and then from the opposite flat surface, taking a cut circumferentially offset from the first cut thus producing the offset lapping ends as shown in Fig. 1.

The ring thus formed has the combined qualities of resiliency desirable for maintaining the ring in expanded condition under slight tension against the walls of the cylinder in which the ring is to be used, together with the relative softness and toughness necessary in a bearing surface intended to make firm contact with the cylinder walls under appreciable pressure without substantial wear or scoring of the cylinder wall.

Preferably the material from which the cylindrical blank is formed is one of the known or other suitable alloys of carbon steel which may contain manganese, phosphorus, sulphur and chromium, and hardenable by heat treatment, the blank, before the hardening heat treatment, being properly normalized in known manner to attain the desired degree of softness and other qualities of normalized carbon steel. With such material the inner zone 12 of the finished article will be found to consist mainly of martensite and the outer normalized zone of sorbite, with an intermediate zone of troostite, relatively thin and sharply defined. The hardening thus terminates quite abruptly in the normalized metal.

It will be noted that inasmuch as the resilient spring portion 12 and the outer bearing portion 11 are integral, they are mutually reinforcing so that the bearing portion 11 although relatively soft does not have to be as thick as where it constitutes an outer self-supporting ring element separate from an inner expansion ring element. Thus where desirable, the outer portion 11 need be only thick enough to allow for wear, thus permitting substantially the greater portion of the ring to be formed of a resilient material of lasting spring quality or low mechanical hysteresis. It is also to be noted that, while for the sake of illustration a definite showing of the relative thickness of the two zones is presented, such showing is made simply by way of example, and that in practice the ratio may be varied to any amount desired.

The high degree of resilience referred to above as being possessed by the split ring of this invention is due possibly to several factors. One is thought to be the thickness of the hardened portion being about as much as is shown in the drawing or thicker as has been referred to previously. Another is the rapid heating whereby the radially inner part may be heated to the desired temperature and quenched before the outer portion becomes substantially heated or hardened, whereby the outer portion may function as is mentioned later. A further factor is the rapid quenching, since rapidity of quenching determines to a considerable extent the degree of hardness and resiliency. One reason for the quenching being rapid is the fact that with differential heating of the work rapidly enough to heat only part of the work depth to a hardening temperature before the rest of the work depth has been substantially heated, the quenching is from opposite sides of the heated depth. The quenching from the radial inside of the heated portion is by means of some known quenching fluid as is referred to in the earlier applications cited. In addition the relatively cold unheated part of the work depth exerts a chilling or quenching action upon the radial outside of the heated portion by absorbing heat from it. Were the full radial depth of the work heated to about the same amount and only the radial inner side of the work quenched, the rapidity of quenching and the degree of hardness and resiliency should not be as great as is possible with quenching or chilling from opposite sides of the heated part where the relatively cold part of the work is one quenching agent and the same type and amount of quenching fluid is used on the radially inner side of the work in both cases. Were the full radial depth of the work heated to a hardening temperature, and only the radial inner side quenched, the chilling and hardening should be less than is the case with this invention, not only because the radial outer portion cannot exert a quenching action upon the inner but the residual heat in the radial outer portion should tend to soften a part at least of the quenched radial inner portion. There should be in such case no such sharp zone of demarcation as is mentioned herein as existing between the hardened and relatively soft portions. No way is known for obtaining such relatively thin zone where the hardened portion appears to terminate abruptly at the edge of a relatively soft unhardened portion, except by heating the part to be hardened rapidly and quenching it before the unhardened part has become substantially hot or hardened. Such thin zone of demarcation is believed to evidence the location of the quenching effect exerted by the unheated and unhardened portion upon the heated part. Of course if the full radial depth of the work were heated and fully chilled from both the radial inside as well as the radial outside, the relatively soft and unhardened radially outer portion desired to reduce wear on an engine cylinder wall would not be present. This invention is believed the first occasion when the advantages of such differential heating and quenching have been appreciated as being desirable in a split ring such as a piston ring or piston skirt, so that more rapid quenching of the heated part may produce a desirable hardness and resiliency in one part and allow a relatively soft unhardened integral surface in another part to remain unchanged.

While I have herein shown and described a specific embodiment of the means and a specific phase of the method of the invention for the sake of disclosure, it is to be understood that the invention is not limited to such specific embodiment or phase but contemplates all such modifications and variants thereof as fall fairly within the scope of the appended claims.

What I claim is:

1. The method of treating a preformed solid wall of circumferentially closed hardenable material for a piston skirt or a piston ring which is relatively soft and unhardened, which includes heating only a radially inner portion of the wall to a hardening temperature without heating the remaining radial portion of the wall to such hardening temperature, quenching the heated inner portion before the full radial depth of the wall has been so heated or becomes hardened, to form an intervening relatively thin and sharply defined zone of demarcation between the hardened and unhardened portions such that the hardened portion appears to terminate abruptly in the unhardened portion, whereby the relatively soft outermost portion has not been hardened, is softer than the hardened portion and is as soft as any portion of the wall so that no hard radially outermost surface has to be removed to provide access to any softer under surface, and splitting the wall to make it contractible and expansible, said splitting being at a single location and across the radial depth of the wall.

2. A split ring of material for use as a piston ring or a piston skirt, which includes a relatively soft, unhardened, radially outermost portion, and an integral, hardened, resilient, radially inner annular portion, said hardened portion being of uniform axial extent throughout the depth thereof, and, there being a relatively thin, sharply defined zone of demarcation between the hardened and unhardened portions such that the hardened portion appears to terminate abruptly in the unhardened portion whereby the relatively soft, unhardened portion has been adapted to remain substantially unheated and unchanged while the radially inner portion was being rapidly heated and hardened but was adapted to exert a quenching effect upon the hardening of the radially inner portion at said thin zone when the radially inner portion was rapidly heated to a hardening temperature and to a radial depth that of the now hardened portion and such heated portion rapidly quenched also from the radially inner side.

WARREN H. FARR.